(12) United States Patent
Benakli

(10) Patent No.: US 7,957,105 B2
(45) Date of Patent: Jun. 7, 2011

(54) SHIELD IN A MAGNETIC DEVICE WITH REDUCED ERASE FIELD

(75) Inventor: Mourad Benakli, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 750 days.

(21) Appl. No.: 11/656,834

(22) Filed: Jan. 23, 2007

(65) Prior Publication Data

US 2007/0242392 A1 Oct. 18, 2007

Related U.S. Application Data

(60) Provisional application No. 60/744,912, filed on Apr. 14, 2006.

(51) Int. Cl.
*G11B 5/39* (2006.01)
(52) U.S. Cl. ........................................ 360/319
(58) Field of Classification Search .................. None
See application file for complete search history.

(56) References Cited

U.S. PATENT DOCUMENTS

| | | | | |
|---|---|---|---|---|
| 5,208,715 A * | 5/1993 | Mowry | | 360/319 |
| 6,097,578 A * | 8/2000 | Pokhil | | 360/319 |
| 6,407,885 B1 * | 6/2002 | Ahagon et al. | | 360/125.44 |
| 6,678,126 B2 * | 1/2004 | Katakura et al. | | 360/321 |
| 6,876,524 B2 * | 4/2005 | Tagawa et al. | | 360/324.12 |
| 7,268,974 B2 * | 9/2007 | Lille | | 360/125.06 |
| 7,296,337 B2 * | 11/2007 | McFadyen | | 29/603.16 |
| 7,518,825 B2 * | 4/2009 | Nishida et al. | | 360/125.2 |
| 7,562,437 B2 * | 7/2009 | Pentek et al. | | 29/603.16 |
| 2006/0067006 A1 * | 3/2006 | Takagishi et al. | | 360/319 |
| 2006/0092562 A1 | 5/2006 | Ho et al. | | |
| 2006/0092565 A1 | 5/2006 | Ho et al. | | |
| 2006/0092566 A1 | 5/2006 | Ho et al. | | |
| 2006/0092569 A1 | 5/2006 | Che et al. | | |
| 2006/0245113 A1 * | 11/2006 | Guan et al. | | 360/319 |

* cited by examiner

*Primary Examiner* — Mark Blouin
(74) *Attorney, Agent, or Firm* — Kinney & Lange, P.A.

(57) ABSTRACT

A shield in a magnetic reader includes a magnetic layer having a first surface and a second surface. The magnetic layer includes at least one aperture that extends through the magnetic layer from the first surface to the second surface. Apertures can be provided in both the top shield and bottom shield of the magnetic reader.

25 Claims, 5 Drawing Sheets

SHIELD IN A MAGNETIC DEVICE WITH REDUCED ERASE FIELD

CROSS-REFERENCE TO RELATED APPLICATION(S)

This application claims priority from Provisional Application No. 60/744,912 filed Apr. 14, 2006, for "Side Shield Cuts in Magnetic Head for Stray Field Sensitivity Reduction" by Mourad Benakli.

BACKGROUND OF THE INVENTION

The present invention relates to magnetic devices. More particularly, the present invention relates a shield design in a magnetic reader that reduces magnetic interactions between the shield, read element, and magnetic medium.

A magnetic reader retrieves magnetically encoded information that is stored on a magnetic medium. The magnetic reader is typically formed of several layers that include a top shield, a bottom shield, and a read element positioned between the top and bottom shields. A resistance of the read element fluctuates in response to magnetic fields emanating from the rotating magnetic medium when the read element is positioned proximate to the magnetic medium. The change in resistance of the read element can be detected by passing a sense current through the read element and measuring the voltage across the read element. External circuitry then converts the voltage information into an appropriate format for processing.

During a read operation, the top and bottom shields ensure that the read element reads only the information stored directly beneath it on the magnetic medium by absorbing stray fields emanating from adjacent tracks and transitions. However, the top and bottom shields, which are large soft magnetic structures, may focus external fields from the adjacent tracks and transitions. This effect is amplified by the vicinity of the soft underlayer of the magnetic medium. The stray fields may lead to a large erase field at the magnetic medium, which is largest at the offtrack edge of the shield due to the shield geometry.

BRIEF SUMMARY OF THE INVENTION

The present invention relates to a shield in a magnetic reader comprising a magnetic layer having a first surface and a second surface. The magnetic layer includes at least one aperture that extends through the magnetic layer from the first surface to the second surface.

DETAILED DESCRIPTION

Figure 1:
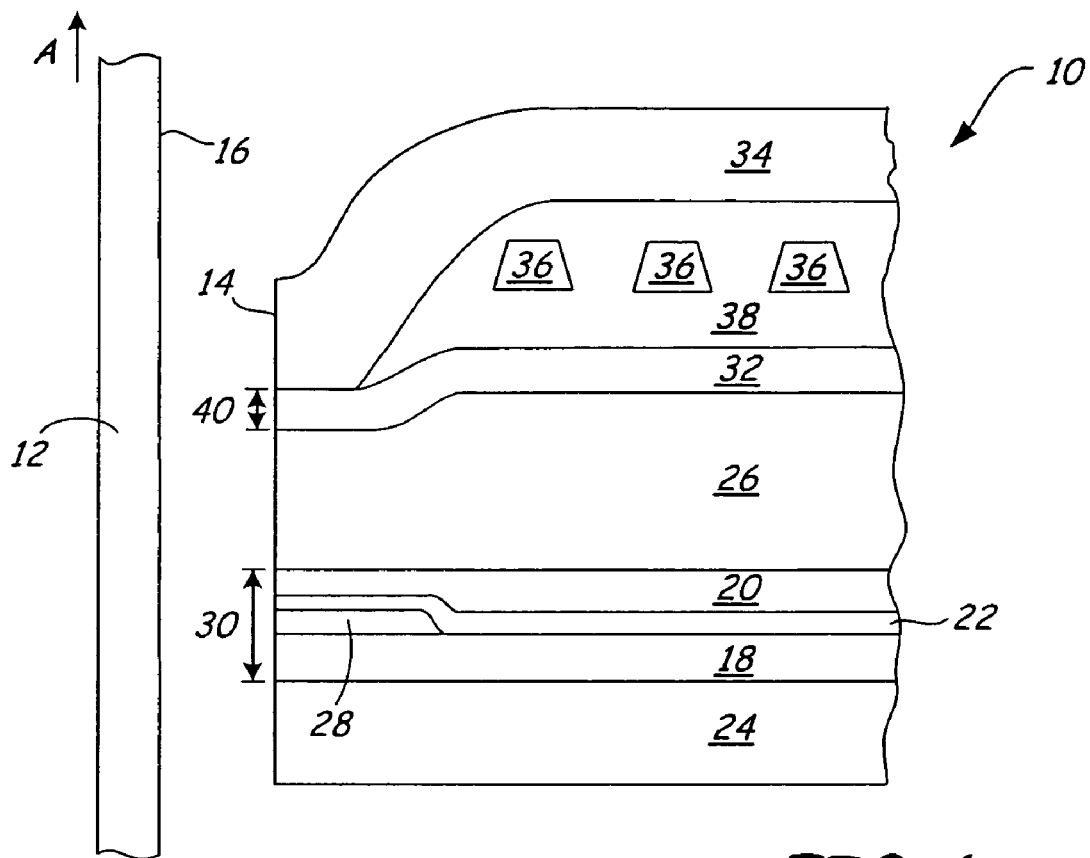
FIG. 1 is a cross-sectional view of a transducing head and a magnetic medium taken along a plane normal to the medium confronting surface of the transducing head.

FIG. 1 is cross-sectional view of magnetic device 10 and magnetic medium 12 taken along a plane normal to medium confronting surface 14 of magnetic device 10. FIG. 1 illustrates magnetic device 10 and its location relative to magnetic medium 12. Medium confronting surface 14 of magnetic device 10 faces medium surface 16 of magnetic medium 12. Magnetic medium 12 moves in a direction relative to magnetic device 10 as indicated by arrow A. A spacing between medium confronting surface 14 and medium surface 16 is preferably minimized while avoiding contact between magnetic device 10 and magnetic medium 12.

A reader portion of magnetic device 10 includes bottom gap layer 18, top gap layer 20, metal contacts 22, bottom shield 24, top shield/shared pole 26, and read element 28. Read gap 30 is defined on medium confronting surface 14 between bottom shield 24 and top shield 26. Metal contacts 22 are positioned between bottom gap layer 18 and top gap layer 20, and read element 28 is positioned between terminating ends of bottom gap layer 18 and metal contacts 22. Read element 28 may be a magnetoresistive (MR) element formed of a material that changes resistance in response to an external field.

A writer portion of magnetic device 10 includes top shield/shared pole 26, write gap layer 32, top pole 34, conductive coils 36, and polymer layer 38. Write gap 40 is defined on medium confronting surface 14 by write gap layer 32 between terminating ends of top pole 34 and top shield 26. In addition to acting as a shield, top shield 26 also functions as a shared pole for use in conjunction with top pole 34. Electrically conductive coils 36 are provided to generate magnetic fields across write gap 40 and are positioned in polymer layer 38 between top pole 34 and write gap layer 32. Although only one layer of coils is shown in FIG. 1, it should be noted that magnetic device 10 may alternatively include multiple layers of coils.

Figure 2:
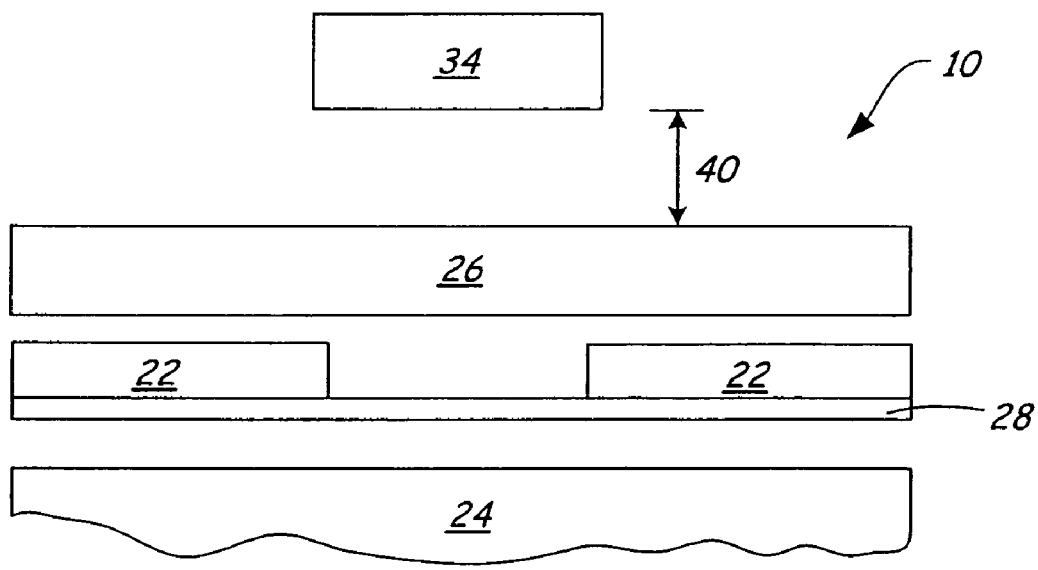
FIG. 2 is a layer diagram of the transducing head shown in FIG. 1.

FIG. 2 is a layer diagram of magnetic device 10. FIG. 2 illustrates the location of a plurality of the magnetic elements in magnetic device 10 as they are arranged along medium confronting surface 14 of magnetic device 10 of FIG. 1. In FIG. 2, the spacing and insulating layers are omitted for clarity. Bottom shield 24 and top shield 26 are spaced to provide for a location of read element 28. Read element 28 has two passive regions defined as the portions of read element 28 positioned adjacent to metal contacts 22. An active region of read element 28 is defined as the portion of read element 28 located between the two passive regions of read element 28. The active region of read element 28 defines a read sensor width.

Bottom shield 24 magnetically isolates read element 28 from stray external magnetic fields, since the output of read element 28 is a function of the magnetic fields operating upon it, and external magnetic fields may affect this output. In a bottom shield of the prior art, shield 24 may focus external fields to produce stray fields that may erase data on the magnetic medium. The bottom shield designs of the present invention reduce erase fields and reduce magnetic interactions between the shield, read element, and magnetic medium.

It should be noted that the reader portion and writer portion are merely shown for purposes of illustrating a configuration of magnetic device 10 that may incorporate a shield for reducing erase fields, and variations on the design may be made. For example, the top shield of the reader portion and the shared pole of the writer portion may be formed as separate elements such that reader portion and writer portion do not share any elements. In addition, while read element 28 is an MR element in some embodiments, the reader portion may include any type of device capable of generating a response to an external magnetic field. Furthermore, while design variations of bottom shield 24 are described herein, similar design variations may be applied to reduce erase fields from top shield 26.

Figure 3:
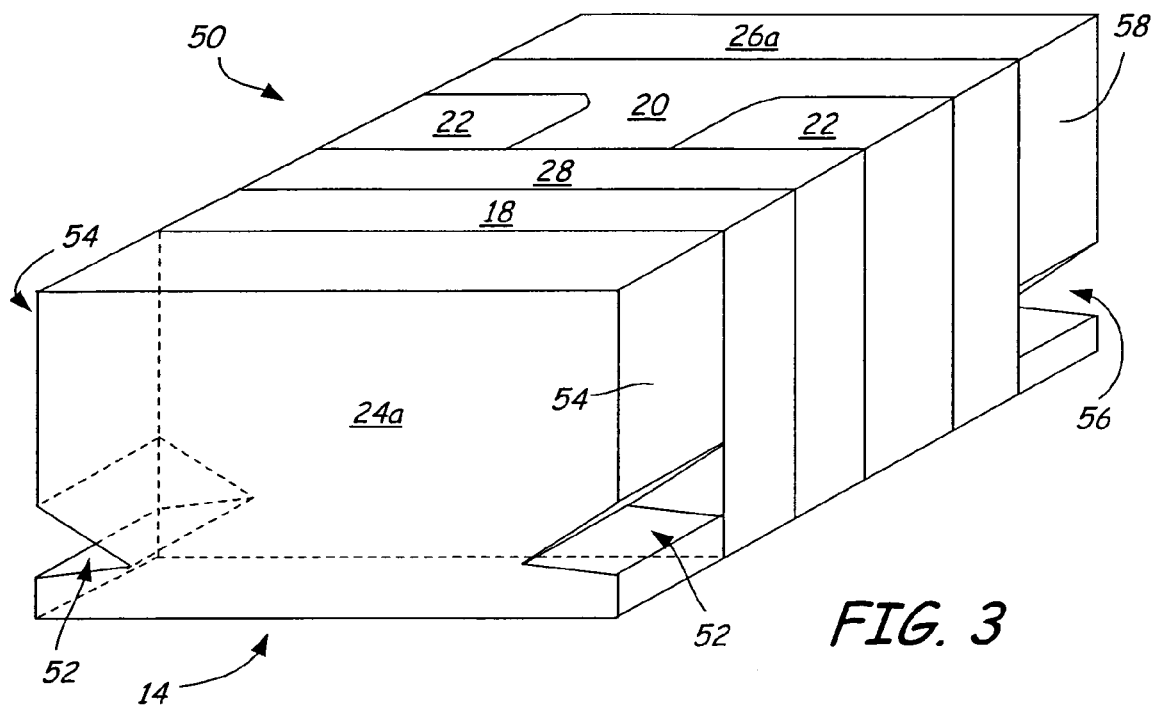
FIG. 3 is a partial perspective view of the reader portion of the transducing head shown in FIG. 1 including a bottom shield with reduced erase fields.

FIG. 3 is a partial perspective view of reader portion 50 of magnetic device 10 including bottom gap layer 18, top gap layer 20, metal contacts 22, and read element 28. Reader portion 50 also includes bottom shield 24a and top shield 26a according to an embodiment of the present invention. Bottom shield 24a and top shield 26a isolate read element 28 from stray magnetic fields emanating from adjacent data tracks or transitions on magnetic medium 12 by absorbing stray magnetic fields. For ease of illustration, thicknesses of bottom gap layer 18, top gap layer 20, metal contacts 22, bottom shield 24a, top shield 26a, and read element 28 are exaggerated and are not drawn to scale. In general, bottom gap layer 18, top gap layer 20, metal contacts 22, bottom shield 24a, top shield 26a, and read element 28 are thin layers each having a thickness less than about 3.0 µm.

In order to reduce erase fields produced by bottom shield 24a and top shield 26a, cuts or notches 52 are formed in sides or edges 54 of bottom shield 24a normal to medium confronting surface 14, and cuts or notches 56 are formed in sides or edges 58 of top shield 26a normal to medium confronting surface 14. Notches 52 and 56 divert stray fields from the edges of bottom shield 24a and top shield 26a, which reduces the erase field spike that is present at the edges of conventional bottom shields. In the embodiment shown, notches 52 and 56 have a substantially triangular cross-section, but notches 52 and 56 may have any shape that reduces the erase field at the edges of bottom shield 24a and top shield 26a. For example, notches 52 and 56 may alternatively have a trapezoidal or ellipsoidal cross-section. Also, while notches 52 and 56 are shown having substantially the same cross-sectional shape, notches 52 and 56 need not be identical in shape to provide the desired reduction in erase fields at the edges of the shields.

Figure 4:
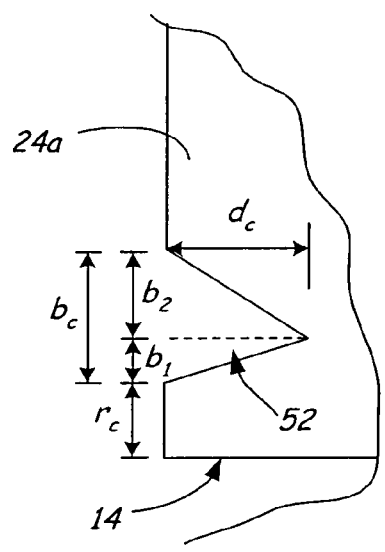
FIG. 4 is a partial plan view of the bottom shield with reduced erase fields shown in FIG. 3.

FIG. 4 is a partial plan view of bottom shield 24a showing variable parameters of notches 52. As will be described in more detail below, the dimensions and properties of notches 52 may be varied to reduce the strength of the erase field. While the following discussion is directed to the effect of varying the dimensions of notches 52, the same analysis is also applicable to notches 56. Notches 52 are recessed from medium confronting surface 14 be a cut recess $r_c$, have a cut depth $d_c$, and have a base $b_c$ that is bifurcated by an imaginary line extending from the peak of notches 52 (shown as a dotted line in FIG. 4) to form base portions $b_1$ and $b_2$. In general, $b_1$ is not equal to $b_2$ such that notches 52 are asymmetrical. In some embodiments, notches 52 have a cross-section in the shape of a scalene triangle.

A suitable range for cut recess $r_c$ is between about 1.0 µm and about 2.0 µm. Exemplary ranges for cut recess $r_c$ include, but are not limited to, between about 1.0 and 1.7 µm and between about 1.3 and 2.0 µm. A suitable range for cut depth $d_c$ is between about 1.5 µm and about 5.0 µm. Exemplary ranges for cut depth $d_c$ include, but are not limited to, between about 1.5 and 3.2 µm, between about 2.5 and 4.2 µm, and between about 3.3 and 5.0 µm. In some embodiments, the ratio of cut recess $r_c$ to cut depth $d_c$ ($r_c/d_c$) is in the range of about 2 to about 10. A suitable range for recess opening $b_c$ is between about 0.5 µm and about 1.0 µm. In some embodiments, the ratio of recess opening $b_c$ to cut depth $d_c$ ($b_c/d_c$) is in the range of about 3 to about 10.

Figure 5:
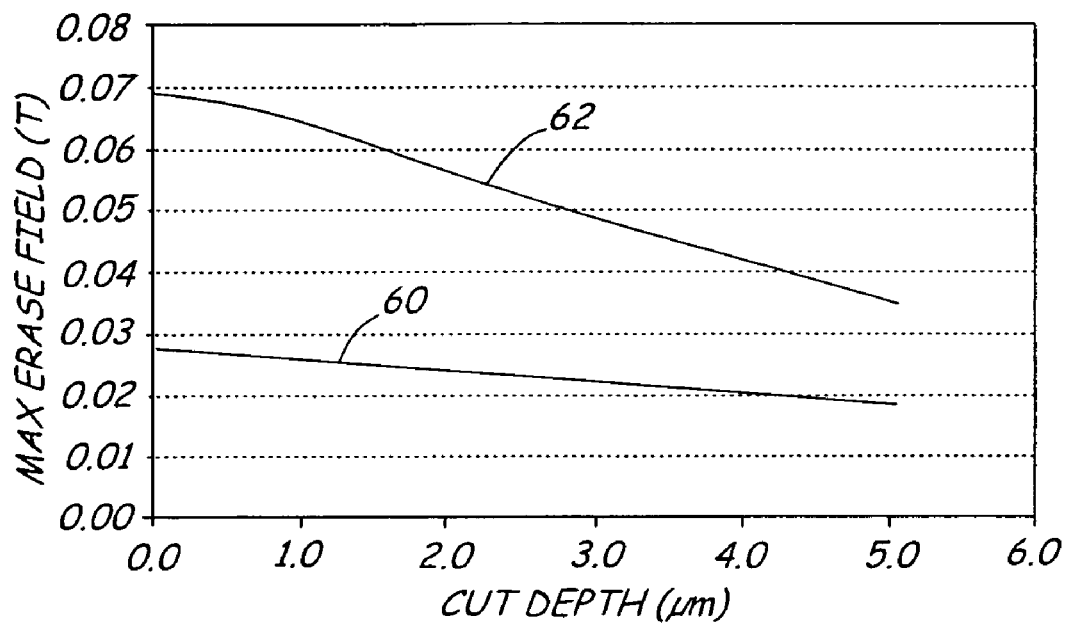
FIG. 5 is a graph showing the maximum erase field produced by the bottom shield with reduced erase fields as a function of notch cut depth.

FIG. 5 is a graph showing the maximum erase field produced by bottom shield 24a as a function of cut depth $d_c$. Line 60 shows the maximum erase field component from bottom shield 24a parallel to medium confronting surface 14, and line 62 shows the maximum erase field component from bottom shield 24a perpendicular to medium confronting surface 14. Cut recess $r_c$ was set to 0.5 µm, and base $b_c$ was set to 2.0 µm with base portions $b_1$ and $b_2$ set to 1.0 µm. Cut depth $d_c$ was varied from 0.0 µm (which simulates bottom shield 24a without notches 52) to 5.0 µm, which is plotted on the horizontal axis of FIG. 5 versus the maximum erase field produced by bottom shield 24a. As is shown, the maximum erase field produced by bottom shield 24a is reduced by over 50% when cut depth $d_c$ is 5.0 µm compared to a bottom shield 24a without notches 52. Thus, the erase field produced by bottom shield 24a is minimized when cut depth $d_c$ is as large as possible design considerations of shield 24a.

Figure 6:
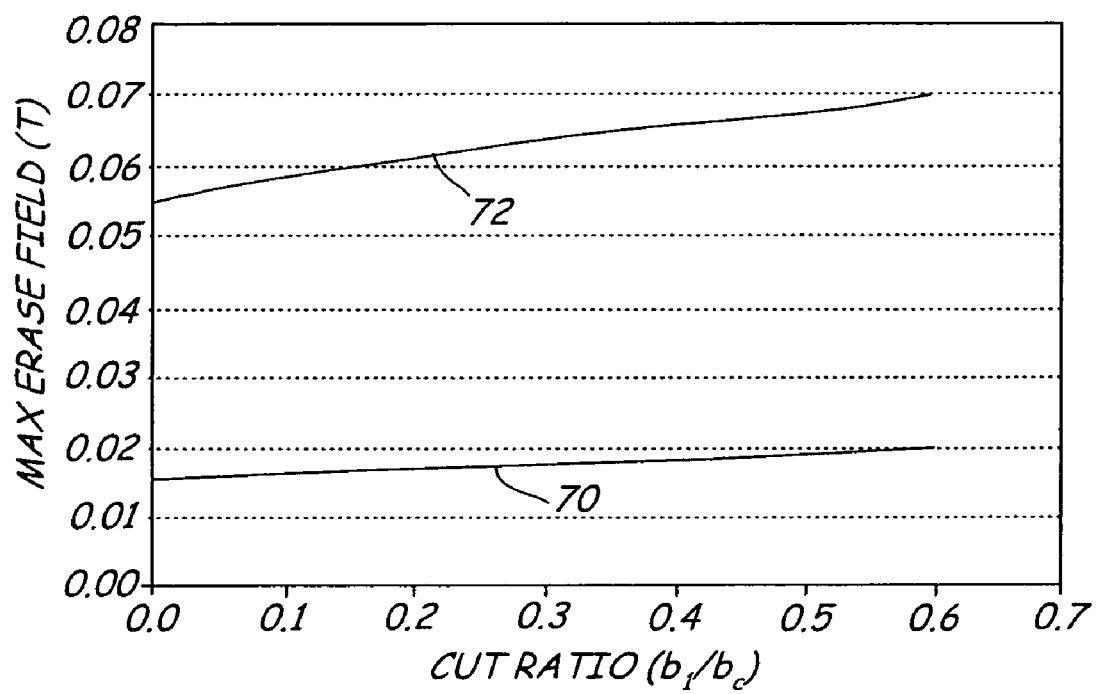
FIG. 6 is a graph showing the maximum erase field produced by the bottom shield with reduced erase fields as a function of the asymmetry of the notches.

FIG. 6 is a graph showing the maximum erase field produced by bottom shield 24a as a function of the asymmetry of notches 52. Line 70 shows the maximum erase field component from bottom shield 24a parallel to medium confronting surface 14, and line 72 shows the maximum erase field component from bottom shield 24a perpendicular to medium confronting surface 14. In the device simulated, cut recess $r_c$ was set to 0.5 µm and cut depth $d_c$ was set to 5.0 µm. The base $b_c$ was set to 2.0 µm and, to simulate notches 52 having various levels of asymmetry, the portion of base $b_c$ made up by base portion $b_1$ was varied. The portion of base $b_c$ made up by base portion $b_1$ is plotted on the horizontal axis of FIG. 5 versus the maximum erase field produced by bottom shield 24a. As is shown, the erase field is minimized when base portion $b_1$ equals 0.0 such that the side of notches 52 proximate to medium confronting surface 14 is parallel to medium confronting surface 14.

Figure 7:
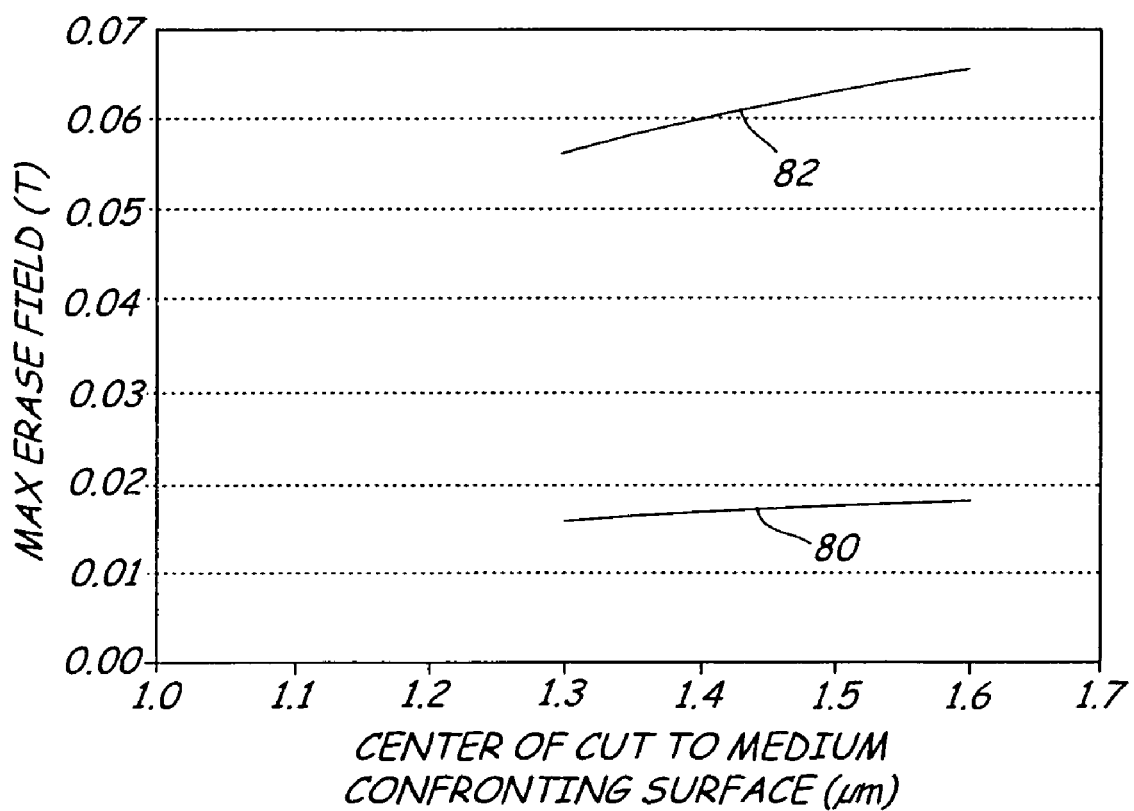
FIG. 7 is a graph showing the maximum erase field produced by the bottom shield with reduced erase fields as a function of notch cut recess relative to the medium confronting surface.

FIG. 7 is a graph showing the maximum erase field produced by bottom shield 24a as a function of cut recess $r_c$. Line 80 shows the maximum erase field component from bottom shield 24a parallel to medium confronting surface 14, and line 82 shows the maximum erase field component from bottom shield 24a perpendicular to medium confronting surface 14. In the device simulated, cut depth $d_c$ was set to 5.0 µm, and base $b_c$ was set to 2.0 µm with base portion $b_1$ set to 0.6 µm and base portion $b_2$ set to 1.4 µm. Cut recess $r_c$ was varied and the distance from medium confronting surface 14 to the center of notches 52 is plotted on the horizontal axis of FIG. 6 versus the maximum erase field produced by bottom shield 24a. As is shown, the erase field is minimized when cut recess $r_c$ is as small as possible within design and fabrication considerations.

Thus, based on the above simulations, the erase field produced by bottom shield 24a may be minimized by providing notches 52 with a maximized cut depth $d_c$, a minimized cut recess $r_c$, and an asymmetry such that the side of notches 52 closest to medium confronting surface 14 is substantially parallel to medium confronting surface 14. In addition to these dimensional considerations, bottom shield 24a may also be made of a material with low permeability to further reduce the erase field generated by bottom shield 24*a*.

Figure 8:
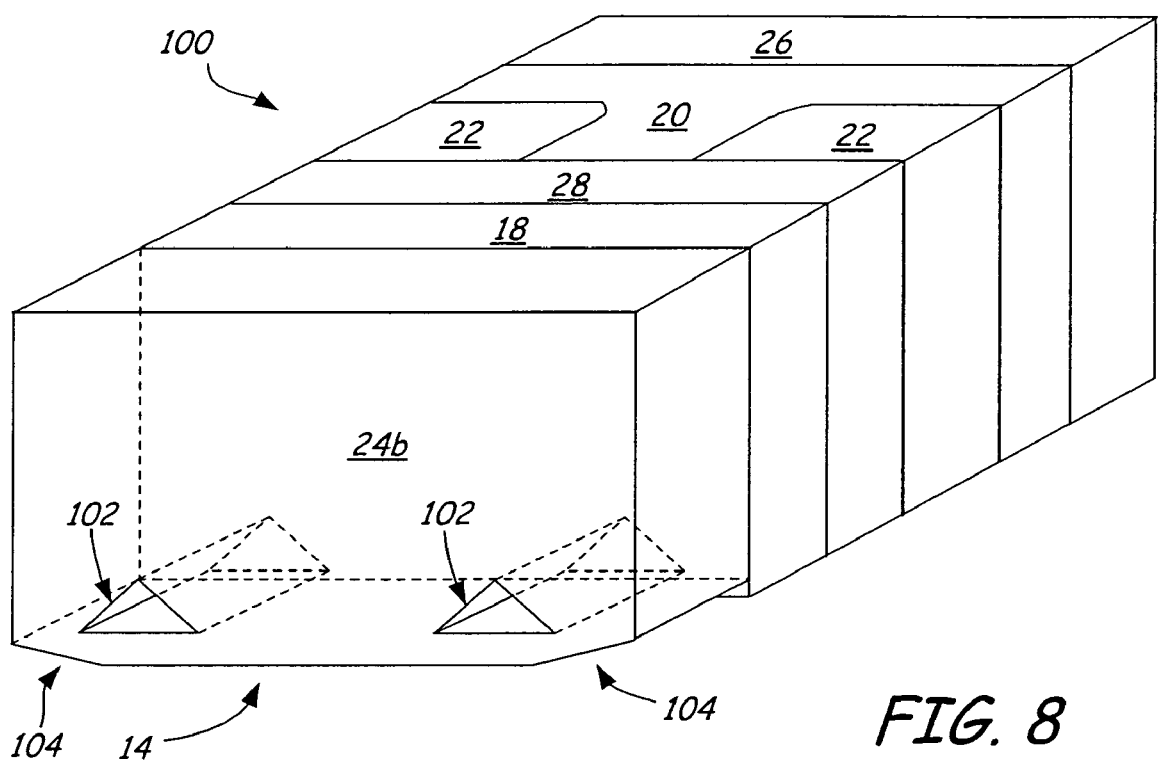
FIG. 8 is a partial perspective view of the reader portion of the transducing head shown in FIG. 1 including another bottom shield with reduced erase fields.

FIG. 8 a partial perspective view of reader portion 100 of magnetic device 10 including bottom gap layer 18, top gap layer 20, metal contacts 22, top shield 26, and read element 28. Reader portion 100 also includes bottom shield 24*b* according to an alternative embodiment of the present invention. Bottom shield 24*b* and top shield 26 isolate read element 28 from stray magnetic fields emanating from adjacent data tracks or transitions on magnetic medium 12 by absorbing stray magnetic fields. Again, for ease of illustration, thicknesses of bottom gap layer 18, top gap layer 20, metal contacts 22, bottom shield 24*b*, top shield 26, and read element 28 are exaggerated and are not drawn to scale. In general, bottom gap layer 18, top gap layer 20, metal contacts 22, bottom shield 24*b*, top shield 26, and read element 28 are thin layers each having a thickness less than about 3.0 µm.

In order to reduce erase fields produced by bottom shield 24*b*, apertures 102 are formed through bottom shield 24*b* proximate to the sides of bottom shield 24*b* and medium confronting surface 14. In particular, apertures 102 function to direct stray fields absorbed by bottom shield 24*b* away from the edges of bottom shields 24*b* to minimize the erase field spike at the edges of bottom shield 24*b*. In some embodiments, apertures 102 have a substantially triangular cross-section, and apertures 102 are formed such that the base of the substantially triangular cross-section is parallel to medium confronting surface 14. In other embodiments, apertures 102 have a trapezoidal or ellipsoidal cross-section. Similar to notches 52 and 56, the dimensions of apertures 102 may be adjusted to minimize the erase field generated by bottom shield 24*b*. Also, bottom shield 24*b* may be made of a material with low permeability to further reduce the erase fields. Furthermore, apertures similar to apertures 102 may be formed in top shield 26 to reduce the erase field generated by top shield 26.

Recesses 104 are provided in bottom shield 24*b* at medium confronting surface 14 such that the sides of shield 24*b* are recessed from medium confronting surface 14. Recesses 104 are formed to reduce the magnetization that can accumulate at medium confronting surface 14. In some embodiments, the beveled edges of bottom shield 24*b* that define recesses 104 form an angle of less than about 10° with medium confronting surface 14. Recesses similar to recesses 104 may also be formed in top shield 106.

In summary, the present invention relates to a shield in a magnetic reader comprising a magnetic layer having a first surface and a second surface. The magnetic layer includes at least one aperture that extends through the magnetic layer from the first surface to the second surface. This reduces stray fields emanated from the shield that could erase data on the medium.

Although the present invention has been described with reference to preferred embodiments, workers skilled in the art will recognize that changes may be made in form and detail without departing from the spirit and scope of the invention.

The invention claimed is:

1. A shield in a magnetic reader comprising a magnetic layer having a first surface and a second surface, wherein the magnetic layer includes only one aperture that extends or only two apertures that extend through the magnetic layer from the first surface to the second surface, wherein the one or two apertures are each spaced from a medium confronting surface of the magnetic layer, and wherein the one or two apertures are each surrounded on all sides by material of the magnetic layer.

2. The shield of claim 1, wherein the one aperture is disposed proximate to the medium confronting surface.

3. The shield of claim 2, wherein the magnetic layer further includes a first edge and a second edge, the first edge and second edge being substantially normal to the medium confronting surface, and wherein the at least one aperture is disposed proximate to at least one of the first edge and the second edge.

4. The shield of claim 3, wherein the magnetic layer is recessed from the medium confronting surface at the first edge and the second edge.

5. The shield of claim 1, wherein the aperture has a substantially triangular cross section.

6. A shield in a magnetic reader comprising a magnetic layer having a medium confronting surface and first and second edges substantially normal to the medium confronting surface, wherein the magnetic layer includes only one notch formed along at least one of the first edge and the second edge that extends through the magnetic layer, wherein the notch has a scalene triangular cross-section.

7. The shield of claim 6, wherein a side of the scalene triangular cross-section is substantially parallel to the medium confronting surface.

8. The shield of claim 6, wherein the one notch has a depth and is recessed from the medium confronting surface by a recess distance, and wherein the ratio of the recess distance to the depth is in the range of about 2 to about 10.

9. The shield of claim 6, wherein the at least one notch has a length along the at least one of the first edge and the second edge and a depth, and wherein the ratio of the length to the depth is in the range of about 3 to about 10.

10. A magnetic reader comprising:
    a first shield including a first magnetic layer, wherein the first magnetic layer comprises at least one aperture that extends through the first magnetic layer;
    a second shield including a second magnetic layer, wherein the second magnetic layer comprises at least one aperture that extends through the second magnetic layer; and
    a read element disposed between the first shield and the second shield.

11. The magnetic reader of claim 10, wherein each of the first and second shields includes a medium confronting surface, and wherein the at least one aperture is disposed proximate to the medium confronting surface.

12. The magnetic reader of claim 11, wherein each of the first and second shields further includes a first edge and a second edge, the first edge and second edge being substantially normal to the medium confronting surface, and wherein the at least one aperture is disposed proximate to at least one of the first edge and the second edge.

13. The magnetic reader of claim 11, wherein at least one of the first and second shield is recessed from the medium confronting surface at the first edge and second edge of the second shield.

14. The magnetic reader of claim 11, wherein the at least one aperture comprises a notch formed along at least one of the first edge and the second edge of the second shield, wherein the notch has a scalene triangular cross-section.

15. The magnetic reader of claim 14, wherein a side of the scalene triangular cross-section is substantially parallel to the medium confronting surface.

16. The magnetic reader of claim 10, wherein the at least one aperture comprises a substantially triangular cross-section and is spaced apart from an edge of the first shield or the second shield.

17. The magnetic reader of claim 10, wherein a cross-section profile of the at least one aperture of the first shield is different from a cross-section profile of the at least one aperture of the second shield.

18. The magnetic reader of claim 12, wherein only one aperture is disposed proximate to the first edge of the first shield, and only one aperture is disposed proximate to the second edge of the first shield.

19. The magnetic reader of claim 12, wherein only one aperture is disposed proximate to the first edge of the second shield, and only one aperture is disposed proximate to the second edge of the second shield.

20. The magnetic reader of claim 14, wherein the at least one aperture comprises only one notch formed along the first edge and only one notch formed along the second edge of the second shield.

21. A shield in a magnetic reader comprising a magnetic layer having a first surface and a second surface, wherein the magnetic layer includes one or more apertures that extend through the magnetic layer from the first surface to the second surface, wherein the apertures are each spaced from a medium confronting surface of the magnetic layer, and wherein the apertures are each surrounded on all sides by material of the magnetic layer.

22. The shield of claim 21, wherein at least one of the apertures is disposed proximate to the medium confronting surface.

23. The shield of claim 22, wherein the magnetic layer further includes a first edge and a second edge, the first edge and second edge being substantially normal to the medium confronting surface, and wherein at least one of the apertures is disposed proximate to at least one of the first edge and the second edge.

24. The shield of claim 23, wherein the magnetic layer is recessed from the medium confronting surface at the first edge and the second edge.

25. The shield of claim 21, wherein at least one of the apertures has a substantially triangular cross section.

* * * * *